United States Patent Office 2,875,255
Patented Feb. 24, 1959

---

2,875,255

CATALYTIC DEHYDROCHLORINATION OF 1,2-DICHLOROETHANE

Kenneth C. Eberly, Akron, Ohio, assignor to The Firestone Tire & Rubber Company, Akron, Ohio, a corporation of Ohio No Drawing. Application November 21, 1956
Serial No. 623,544

24 Claims. (Cl. 260—656)

This invention relates to a process for the production of vinyl chloride and, more particularly, relates to a process for the production of vinyl chloride by the catalytic dehydrohalogenation of 1,2-dichloroethane.

It has been known for some time that unsaturated chlorohydrocarbons may be prepared by dehydrogenation of saturated chlorinated hydrocarbons through the splitting out of a molecule of hydrochloric acid. Many processes have been suggested—some catalytic, some non-catalytic—whereby unsaturated chlorohydrocarbons may be prepared by dehydrohalogenation. All of these prior processes, however, have been unsatisfactory for one reason or another, usually because of poor yields and undesired by-products.

The non-catalytic dehydrohalogenation processes have generally employed temperatures in the neighborhood of from 600–800° C. or higher. The use of such high temperatures has resulted in undesirable decomposition of the unsaturated primary product and the production of undesirably large amounts of such compounds as ketones and aldehydes. Moreover, where contact materials are employed in the reaction zone to increase the contact between the chlorinated hydrocarbon feed and the heating surfaces, considerable difficulty has been experienced with carbonization and consequent plugging of the reactor.

In the catalytic processes in which such catalysts as metal salts, and particularly the metal chlorides, have been employed, lower temperatures have been utilized. However, due to the presence of the catalyst, both carbonization and undesired production of by-products have occurred even at the reduced temperatures.

Accordingly, it is the primary object of the present invention to produce vinyl chloride by a catalytic dehydrohalogenation process wherein 1,2-dichloroethane is converted to an effluent substantially completely containing vinyl chloride, hydrochloric acid and unreacted 1,2-dichloroethane.

A further object of the invention is a process for producing vinyl chloride by catalytic dehydrohalogenation of 1,2-dichloroethane in which side reactions are substantially completely eliminated.

In accordance with the present invention, it has been discovered that 1,2-dichloroethane may be catalytically dehydrohalogenated without carbonization or production of undesired by-products if certain specific catalysts and critical reaction conditions are employed.

Generally described, the present invention comprises a process for the production of vinyl chloride by catalytic dehydrohalogenation of 1,2-dichloroethane which comprises contacting 1,2-dichloroethane with a metal chloride catalyst in a reaction zone maintained at a temperature of between about 300° and about 550° C., said catalyst being selected from the group consisting of the chlorides of the alkali metals, zinc, strontium, cadmium and nickel, the residence time of the reaction gas in the presence of the catalyst being sufficient to effect at least a 50% conversion of the 1,2-dichloroethane. The residence time necessary in each case depends on the temperature and the particular catalyst employed.

In accordance with the preferred embodiment of the process of the invention, a tubular reactor is employed. This tubular reactor desirably is formed from a length of iron or stainless steel pipe, porcelain tubing, glass tubing, or the like. The desired temperatures preferably are obtained by enclosing the reaction zone of the tube in either an electric or gas-fired furnace similar to those employed in the hydrocarbon cracking art. Other heating means such as molten salt baths and the like may be employed as desired.

The catalyst may be introduced into the reaction zone in a number of different fashions. Preferably, where a tubular reactor is employed, the catalyst is coated on the interior surface of the tube by contacting that surface with a concentrated solution of the catalyst and evaporating the solvent. Alternatively, the catalyst is deposited on a support such as silica, zirconia, zirconium silicate, and the like, and suitably maintained in the desired position within the reaction tube as by use of conventional catalyst supporting grids and screens.

Excellent results are also obtained with a "fluid" type catalyst. Where the "fluid" type catalyst is employed, it is preferred to pass the 1,2-dichloroethane feed into the reactor in admixture with pulverulent catalyst material, preferably having a particle size of between about 300 and about 600 mesh. Desirably, from about 0.1 to about 10% by weight of particulate catalyst per g. mole of 1,2-dichloroethylene feed will be employed in the "fluid" catalyst process. The catalyst particles may be separated from the effluent in a conventional cyclone separator and recovered for recycling to the reaction. Either or both of the catalyst particles and the 1,2-dichloroethane feed may be preheated prior to admixture.

As indicated, the catalyst materials which are operable in the invention are the alkali metal chlorides and the chlorides of zinc, strontium, cadmium and nickel. The preferred alkali metal chlorides are the sodium, potassium and lithium chlorides. Rubidium and caesium chlorides give excellent yields but are not preferred due to their scarcity and expense.

In order to obtain the most efficient use of the specified metal chloride catalysts in the process of the invention, the feed of 1,2-dichloroethane, or 1,2-dichloroethane in admixture with pulverulent catalyst, should be regulated in order that the residence time of the reaction gas in the presence of the catalyst in the reaction zone is sufficient to effect at least a 50% conversion of the 1,2-dichloroethane.

Having generally described the invention, specific embodiments are exemplified to illustrate the invention and to compare the catalyst of the invention with other metal chlorides. In Examples 1–12, pure ethylene dichloride (1,2-dichloroethane having a melting point of −35.6° C.) was passed at a uniform rate of 0.756 g. moles/hr. into a ½ inch steel pipe (0.808 cm. inside radius) which was heated for a length of 61 centimeters at a temperature of about 475° C. The catalyst was disposed on the inner surface of the steel pipe by application of an aqueous solution of the metal chloride followed by evaporation of the water. Exactly 62.3 grams (50 milliliters) of ethylene dichloride was introduced to the reactor in each run at a rate of 1 milliliter per minute. Three milliliters per minute of nitrogen was passed through the reaction tube to exclude air.

TABLE I

| Example | Catalyst | Amount of Dry Catalyst (grams) | Conversion (percent) | Time of Exposure (sec.) | Rate Constant (sec.⁻¹) |
|---|---|---|---|---|---|
| 1 | None (clean iron pipe) | ---------- | 15.3 | 8.699 | 0.0191 |
| 2 | ZnCl₂ | 0.22 | 67.34 | 7.021 | 0.1594 |
| 3 | NaCl | 0.28 | 50.18 | 7.499 | 0.0929 |
| 4 | KCl | 0.21 | 64.00 | 7.109 | 0.1437 |
| 5 | SrCl₂ | 0.22 | 66.90 | 7.033 | 0.1572 |
| 6 | LiCl | 0.24 | 66.12 | 7.053 | 0.1535 |
| 7 | NiCl₂·6H₂O | 0.32 | 65.77 | 6.363 | 0.1685 |
| 8 | CdCl₂ | 0.22 | 55.22 | 7.352 | 0.1093 |
| 9 | MnCl₂·6H₂O | 0.26 | 13.03 | 8.797 | 0.0158 |
| 10 | MgCl₂·6H₂O | 0.28 | 17.5 | 8.616 | 0.0223 |
| 11 | AlCl₃·6H₂O | 0.26 | 14.7 | 8.728 | 0.0182 |
| 12 | CoCl₂·6H₂O | 0.26 | 14.11 | 8.723 | 0.0183 |

The reaction effluent of Examples 2–8 substantially completely consisted of unreacted ethylene dichloride, hydrogen chloride and vinyl chloride. No carbonization was detected.

Example 13

Pure ethylene dichloride is uniformly passed through a one and one-half inch glass tube at a rate of about 1 g. mole/hr., the tubing being heated through about 70 cm. of its length to a temperature of about 540° C. Pulverulent lithium chloride (of a particle size passing through a 400 mesh screen) is injected into the tube at a point adjacent the inlet thereof and passed through the tube in intimate admixture with the ethylene dichloride feed. A conversion of ethylene dichloride to vinyl chloride and hydrogen chloride of in excess of 50% is obtained without generation of appreciable carbonization or other by-products.

Example 14

Pure ethylene dichloride is passed at a rate of about 0.5 g. mole/hr. through a reaction chamber containing a particulate catalyst comprising potassium chloride supported on silica and maintained at a temperature of about 310° C. A conversion of ethylene dichloride to vinyl chloride and hydrogen chloride of in excess of 50% is obtained without production of appreciable carbonization or by-products.

In Examples 1–12, the time of exposure or residence time of the reaction gases was calculated in accordance with the following formula:

$$\frac{3600 \times 3.1416 \times \text{heating length (61 cm.)} \times (\text{inside radius of pipe in cm.})}{22400 \times \text{rate of flow of } C_2H_4Cl_2 \text{ in moles/hr.} \times \frac{760 \text{ mm.}}{740 \text{ mm.}} \times \frac{T \text{ of pipe } (748° \text{ K.})}{273}}$$

part of denominator →

$$\times (1 + 0.5 \text{ conversion}) + 60 \times 3 \text{ ml./min.} \times \frac{748}{297}$$

Room temperature at time of runs = 297° K.
Pressure at time of runs averaged = 740 mm.

The residence time may be somewhat more easily calculated by the following:

$$t \text{ (sec.)} = \frac{3600 \pi r^2 L \times 273 B}{22400 \times 760 RT \left(2 + \frac{c}{2.3026 \log (1-c)}\right)}$$

$r$ = inside radius of pipe in cm.
$L$ = up-to-temperature length of pipe in cm.
$R$ = rate of input of ethylene dichloride in g. moles/hr.
$T$ = reaction temperature in degrees Kelvin
$B$ = barometric pressure (mm.) corrected
$c$ = final conversion of ethyl dichloride to product as fraction of the whole The rate constant was calculated by the following formula:

$$k \text{ (rate constant)} \text{ (in sec.}^{-1}) = \frac{2.3026}{\text{time of exposure in sec.}} \times \log_{10} \frac{100}{100 - \text{percentage conversion}}$$

From the foregoing examples, it will be seen that excellent conversions of 1,2-dichloroethane may be obtained without carbonization and without production of the undesired by-products such as the aldehydes, ketones and the like which are obtained in prior art processes. Moreover, it will be noted that similar results are not obtained with all metal chlorides.

It has been found that if temperatures below about 300° C. are employed, the reaction rates are too slow for commercial use. On the other hand, if temperatures in excess of about 550° C. are employed, side reactions occur with substantial production of acetylene, ketones, benzene and cyclooctatetraene. The presence of air has also been found to result in some ketone production. The presence of ketones in the effluent is particularly undesirable since the recycled 1,2-dichloroethane is thus contaminated, and the rate of reaction with contaminated 1,2-dichloroethane is greatly reduced.

In view of the foregoing disclosure, modifications of the invention will be apparent to those skilled in the art. Consequently, it is intended that the invention be limited only by the scope of the appended claims.

What is claimed is:

1. A process for production of vinyl chloride by catalytic dehydrohalogenation of 1,2-dichloroethane which comprises, contacting 1,2-dichloroethane with a metal chloride catalyst in a reaction zone maintained at a temperature of between about 300° and about 550° C., said catalyst being selected from the group consisting of the chlorides of the alkali metals, zinc, strontium, cadmium and nickel, the residence time of the reaction gas in the presence of the catalyst being sufficient to effect at least a 50% conversion of the 1,2-dichloroethane.

2. A process for production of vinyl chloride by catalytic dehydrohalogenation of 1,2-dichloroethane which comprises, contacting 1,2-dichloroethane with a metal chloride catalyst in a tubular reactor maintained at a temperature of between about 300 and about 550° C., said catalyst being selected from the group consisting of the chlorides of the alkali metals, zinc, strontium, cadmium and nickel, the residence time of the reaction gas in the presence of the catalyst being sufficient to effect at least a 50% conversion of the 1,2-dichloroethane.

3. A process according to claim 2 in which the catalyst is an alkali metal chloride.

4. The process according to claim 2 in which the catalyst is a zinc chloride.

5. A process according to claim 2 in which the catalyst is strontium chloride.

6. A process according to claim 2 in which the catalyst is cadmium chloride.

7. A process according to claim 2 in which the catalyst is nickel chloride.

8. A process for production of vinyl chloride by catalytic dehydrohalogenation of 1,2-dichloroethane which comprises passing 1,2-dichloroethane through a tubular reactor, the inner surface thereof being lined with a coating of a metal chloride catalyst maintained at a temperature of about 300° to about 550° C, said catalyst being selected from the group consisting of the chlorides of the alkali metals, zinc, strontium, cadmium and nickel, the residence time of the reaction gas in the presence of the catalyst being sufficient to effect at least a 50% conversion of the 1,2-dichloroethane.

9. A process according to claim 8 in which the catalyst is an alkali metal catalyst.

10. The process according to claim 8 in which the catalyst is a zinc chloride.

11. A process according to claim 8 in which the catalyst is strontium chloride.

12. A process according to claim 8 in which the catalyst is cadmium chloride.

13. A process according to claim 8 in which the catalyst is nickel chloride.

14. A process for production of vinyl chloride by catalytic dehydrohalogenation of 1,2-dichloroethane which comprises passing 1,2-dichloroethane in admixture with pulverulent metal chloride through a tubular reaction zone maintained at a temperature of between about 300 and about 550° C., said catalyst being selected from the group consisting of the chlorides of the alkali metals, zinc, strontium, cadmium and nickel, the residence time of the reaction gas in the presence of the catalyst being sufficient to effect at least a 50% conversion of the 1,2-dichloroethane.

15. A process according to claim 14 in which the catalyst is an alkali metal chloride.

16. The process according to claim 14 in which the catalyst is a zinc chloride.

17. A process according to claim 14 in which the catalyst is strontium chloride.

18. A process according to claim 14 in which the catalyst is cadmium chloride.

19. A process according to claim 14 in which the catalyst is nickel chloride.

20. A process for production of vinyl chloride by catalytic dehydrohalogenation of 1,2-dichloroethane which comprises passing 1,2-dichloroethane through a reaction zone in contact with a supported metal chloride catalyst in a reaction zone maintained at a temperature of between about 300° and about 550° C., said catalyst being selected from the group consisting of the chlorides of the alkali metals, zinc, strontium, cadmium and nickel, the residence time of the reaction gas in the presence of the catalyst being sufficient to effect at least a 50% conversion of the 1,2-dichloroethane.

21. A process according to claim 20 in which the catalyst is an alkali metal chloride.

22. The process according to claim 20 in which the catalyst is a zinc chloride.

23. A process according to claim 20 in which the catalyst is strontium chloride.

24. A process according to claim 20 in which the catalyst is cadmium chloride.

References Cited in the file of this patent

UNITED STATES PATENTS

| | | |
|---|---|---|
| 2,539,307 | Koll | Jan. 23, 1951 |
| 2,765,350 | Conrad | Oct. 2, 1956 |
| 2,779,804 | Braconier et al. | Jan. 29, 1957 |